United States Patent
Sannegowda et al.

(10) Patent No.: US 9,332,011 B2
(45) Date of Patent: May 3, 2016

(54) SECURE AUTHENTICATION SYSTEM WITH AUTOMATIC CANCELLATION OF FRAUDULENT OPERATIONS

(71) Applicants: Yash Karakalli Sannegowda, Bangalore (IN); Mohan Sundaram, Bangalore (IN); Karthikeyan Iyer, Mumbai (IN)

(72) Inventors: Yash Karakalli Sannegowda, Bangalore (IN); Mohan Sundaram, Bangalore (IN); Karthikeyan Iyer, Mumbai (IN)

( * ) Notice: Subject to any disclaimer, the term of this patent is extended or adjusted under 35 U.S.C. 154(b) by 61 days.

(21) Appl. No.: 14/226,867

(22) Filed: Mar. 27, 2014

(65) Prior Publication Data

US 2014/0304510 A1  Oct. 9, 2014

(51) Int. Cl.
*H04L 9/32* (2006.01)
*H04L 29/06* (2006.01)
*G06F 21/44* (2013.01)
*G06F 17/00* (2006.01)

(52) U.S. Cl.
CPC ............ *H04L 63/0853* (2013.01); *G06F 21/44* (2013.01); *G06F 2221/2103* (2013.01); *H04L 63/0428* (2013.01); *H04L 63/1475* (2013.01)

(58) Field of Classification Search
CPC ............ H04L 63/0853; H04L 63/0884; H04L 63/123
USPC .......................... 713/168, 170, 171; 726/1, 26
See application file for complete search history.

(56) References Cited

U.S. PATENT DOCUMENTS

| | | | | |
|---|---|---|---|---|
| 6,195,698 B1 * | 2/2001 | Lillibridge | .............. | G06F 21/31 709/203 |
| 6,895,502 B1 * | 5/2005 | Fraser | ................... | G06Q 20/42 713/168 |
| 7,200,576 B2 * | 4/2007 | Steeves | ................ | G06Q 20/367 705/50 |
| 7,962,742 B2 | 6/2011 | Schwarz | | |
| 8,522,025 B2 * | 8/2013 | Lakshmeshwar | ..... | H04L 9/3271 713/170 |
| 2002/0104006 A1 * | 8/2002 | Boate | .................. | H04L 63/0853 713/186 |
| 2005/0149730 A1 * | 7/2005 | Aissi et al. | ..................... | 713/168 |
| 2007/0011452 A1 | 1/2007 | Marquet | | |
| 2008/0082821 A1 * | 4/2008 | Pritikin | .......................... | 713/169 |
| 2008/0149700 A1 * | 6/2008 | Tuyls et al. | .................... | 235/375 |
| 2011/0238573 A1 * | 9/2011 | Varadarajan | ....... | G06Q 20/1085 705/43 |
| 2015/0106216 A1 * | 4/2015 | Kenderov | .......... | G06Q 20/4014 705/21 |

FOREIGN PATENT DOCUMENTS

WO  2009066217 A2  10/2009

* cited by examiner

*Primary Examiner* — Abu Sholeman
(74) *Attorney, Agent, or Firm* — Hauptman Ham, LLP (57) ABSTRACT

The present invention relates to a method and system to securely authenticate an operation request using a secure device. Automatic rejections are initiated on the basis of detection of mismatch of information by the secure device received from a server computer and an insecure terminal. The system and method further enables the user to manually confirm/reject operation requests by providing user inputs on an insecure terminal.

67 Claims, 4 Drawing Sheets

SECURE AUTHENTICATION SYSTEM WITH AUTOMATIC CANCELLATION OF FRAUDULENT OPERATIONS

The present application is based on, and claims priority from Indian Application no. 1614/CHE/2013, filed on 9 Apr. 2013, the disclosure of which is hereby incorporated by reference.

TECHNICAL FIELD

This invention relates to secure authentication of operations requested to be performed over an online communication network such as an internet or intranet, from a user computer whose security may have been compromised. More particularly, the present invention relates to methods and systems involving the use of an intelligent token or device to ensure secure authentication.

BACKGROUND

With the evolution of communications technology and the internet, the number of functions performed by users over an online environment has increased manifold. To perform these functions, users need access to system resources and interact with the system by providing and partaking of information in an interactive yet secure manner. This information is increasingly prone to attack and misuse in online environments. Secure authentication mechanisms are a pressing need.

The most widely prevalent user authentication mechanism is the username and password approach. This method is however, highly vulnerable to attack by malicious programs resident on various systems in the network, especially the system used by the user to access the network example keyboard sniffers. The problem is further exacerbated by the fact that most users tend to use a single user name and password for a variety of applications.

Another single factor mechanism involves the usage of captcha images. The user analyzes the image and types in the information to be sent and authenticated by the authentication system. As with any password or token, these can be intercepted by malicious programs at the time of input by the user. Using the intercepted captcha during input, attacker can establish the session either from the same terminal or from a remote terminal.

To prevent key loggers from keyboard sniffing, Virtual Keyboard method is adopted by many of the applications. User uses mouse to enter the keypad on screen, attacker can still intercept the entered data from memory of the application directly and equally vulnerable like password based authentication and transactions systems.

Hardware or software based One Time Password (OTP) Authentication Systems provide a second factor in the form of a random number password that changes every minute or so; this method has been adopted to prevent password cracking and stealing. Of course, this random number can be intercepted by keyboard sniffers. During the period the OTP is valid, the system is vulnerable to attack. Both software and hardware tokens are vulnerable in this respect.

To eliminate key logging, there are hardware OTP generators (including ones that use smart card) that allow the applications to fetch the OTP from the device and send it to the authenticating server. However, malware can read this OTP from the memory of the application that queries the OTP. During the period the OTP is valid, the system is vulnerable to attack.

Multi-factor authentication systems have been proposed in prior art (e.g. U.S. Pat. App. No. 20070067642A1) to provide multiple lines of defense. These typically involve the use of different types of factors in addition to what you know (password) and what you have (token), namely who you are (biometric parameters such as fingerprint or retinal image) and where you are (user geo-location parameters). These factors can either be generated in the user terminal or in a device connected to the user terminal. Devices that store secure credentials usually also have an authentication mechanism to verify if the device is valid and is connected to the network (e.g. U.S. Pat. App. No. 20070011452A1). If so, operations utilizing secure credentials stored on such devices are authorized by the server.

However, these operations can be intercepted by malware in the user terminal from the memory of the application.

Even if these authentication factors are encrypted in a secure device and sent to user terminal such that they are not readable by malware, malware can send them in encrypted form along with its own fraudulent request. The server, in such a scenario will not be able to ascertain that the requested operation is fraudulent. To be able to do this, the server has to verify the data or information in the operation request sent from user terminal, in addition to the authentication factors.

Information can be signed using digital certificates. Irrespective of whether the digital certificate is stored on the user terminal or on a read-only USB drive, malware can modify the information in the operation request before signing. The server will not be able to distinguish between a valid request and fraudulent request because both will be signed with a valid digital certificate.

Another mechanism proposed for secure authentication involves the use of multiple channels, such as the internet and the telephone network, be it circuit-switched or packet based. The request for performing an operation is sent over one channel (e.g. from user terminal over the internet), and the request is partially or fully authenticated on another channel (code entered or SMS sent from handheld device over telephone or internet channel, or information sent over IVR). Sophisticated malware today is capable of executing synchronized attacks across multiple channels e.g. malware resident on both user terminals intercepts and modifies information in step with the flow of the requested operation.

Given these vulnerabilities, it has been proposed in prior art to have the user, as part of the operation request, confirm the operation in a secure environment having a secure display and secure mechanism for user to provide confirmation. The environment also has capability to securely exchange information with the server.

U.S. Pat. No. 7,962,742 describes a secure terminal device with a secure display and secure keyboard to which a user can seamlessly switch over to perform sensitive tasks such as online transactions.

U.S. Pat. No. 6,895,502 describes a method for secure transactions using a server-initiated challenge response mechanism and a secure user device where challenge is displayed to the user on a secure display and the user can confirm his response to the challenge using a secure input mechanism.

Pat. App. No. WO2009066217A2 describes a method for secure transactions where the user operation request is first sent to a secure device which displays the same to the user on a secure display and on user confirmation using a secure input mechanism, securely sends the request to the server.

Independent of whether the user confirmation step is triggered from server or client side, information related to every operation has to be displayed on the secure display and confirmed using a secure input mechanism by the user. The onus of security therefore is completely passed on to the user. The user has to read every operation request and manually confirm or reject the operation.

U.S. Pat. No. 6,895,502 also discusses the possibility of requesting user confirmation only for operations that qualify above a pre-determined threshold or single confirmation step for a set of similar operations based on cached information. However, these operations that do not go through manual user confirmation step are no longer guaranteed to be secure.

As per methods in prior art, to prevent a transaction from getting hi-jacked by malware, the transaction must be confirmed in a separate secure environment i.e. an environment which has Secure Display and Secure Keyboard, and encryption capabilities. Usually, the secure environment is provided in a small portable device with a small display and small keyboard, typically with just an Accept and a Reject button. This leaves a definite possibility of an inadvertent error on the part of the user. More complex confirmation codes that can prevent inadvertent user error need a larger set of keys that is difficult to support on a small portable device, and tedious for the user as well.

Also as per prior art, to prevent fraudulent transactions, the user must manually authorize every transaction in a secure environment.

Over a period of time, given that a majority of transactions are not fraudulent, there is a possibility that the user might get used to providing confirmation for a transaction without reading the full data displayed on Secure Display.

There is a clear need for systems and methods that do not require manual intervention from the user to authenticate each and every transaction. Also, there is a need for systems and methods that allow the user to provide manual confirmation using regular and comfortable input mechanisms such as a full-sized keyboard attached to an insecure environment without compromising on authentication validity and transaction security.

OBJECT OF INVENTION

The principal object of this invention is to propose a method and system to enable automatic rejection of fraudulent operation requests without any manual intervention from the user, using a secure device.

Another object of this invention is to propose a method and system for the user to be able to provide manual confirmation/rejection of operation requests on the insecure user terminal without compromising on authentication validity and transaction security.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

SUMMARY

Accordingly in a primary embodiment, the invention provides a system and method for automatically rejecting fraudulent operations over a communication network. The method includes receiving, at a server, an operation request from an insecure terminal, and creating a challenge in response to receiving the request, the challenge including an operation identifier and nonce. Further, the method includes encrypting by the server the challenge and sending the encrypted challenge to a secure device connected to the insecure terminal. Furthermore, the method includes requesting by the secure device a copy of the original operation request from the insecure terminal. Furthermore, the method includes decrypting by the secure device the encrypted challenge, retrieving the operation identifier from the challenge and comparing the operation request received from the insecure terminal and the operation identifier received from the server. Furthermore, the method includes constructing by the secure device a challenge rejection response on detecting mismatch between the operation request received from the insecure terminal and the operation identifier received from the server, encrypting the challenge rejection response, and sending the encrypted challenge rejection response to the server. Furthermore, the method includes decrypting by the server the encrypted challenge rejection response, and rejecting access to the requested operation in accordance to the decrypted challenge rejection response.

Accordingly, in another embodiment, the invention provides a system and method for authenticating operations over a communication network where the user can provide confirmation or rejection on the insecure terminal. The method includes receiving, at a server, an operation request from an insecure terminal, and creating a challenge in response to receiving the request, the challenge including an operation identifier, nonce, a random tag for confirmation and optionally, a random tag for rejection. Further, the method includes encrypting by the server the challenge and sending the encrypted challenge to a secure device connected to the insecure terminal. Furthermore, the method includes decrypting by the secure device the encrypted challenge and presenting on the secure device the operation identifier, the random tag for confirmation and optionally, the random tag for rejection retrieved from the decrypted challenge. Furthermore, the method includes requesting the user to verify the operation identifier displayed on the secure device and provide the random tag for confirmation or the optional random tag for rejection on the insecure user terminal. Alternatively, the method includes initiating on the secure device a timer and requesting the user to provide the random tag for confirmation or the optional random tag for rejection on the insecure terminal before expiry of timer on the secure device. Furthermore, the method includes receiving by the insecure terminal the tag provided by the user, sending by the insecure terminal the received tag to the server in unencrypted form. Furthermore, the method includes the server allowing access to the protected resource if the received tag matches the random tag for confirmation sent from the server to the secure device. Furthermore, the method includes the server rejecting access to the protected resource if the received tag matches the random tag for rejection sent from the server to the secure device or does not match with either the random tag for confirmation or random tag for rejection sent from the server to the secure device. Furthermore the method includes the server rejecting the operation request if no tag is received from the insecure terminal within a reasonable time period for response set by the server.

In an alternative embodiment, the method includes receiving by the insecure terminal the tag provided by the user, sending by the insecure terminal the received tag to the secure device, receiving by the secure device the tag from the insecure terminal, constructing by the secure device a challenge confirmation response in the event of determining a match between the random tag for confirmation received from the server and the tag received from the user terminal or a challenge rejection response in the event of determining a match between the random tag for rejection received from the server and tag received from the user terminal or in the event of not determining a match between either the random tag for confirmation or the random tag for rejection received from the server and tag received from the user terminal. In the alternative embodiment of secure device having initiated a timer, the method includes constructing by the secure device a challenge rejection response in the event of expiry of timer before receiving any tag from the insecure user terminal. Furthermore, the method includes encrypting the challenge response, and sending the encrypted challenge response to the server. Furthermore, the method includes decrypting by the server the encrypted challenge response and allowing or rejecting access to the protected resource to the user terminal in accordance to the decrypted challenge response.

Accordingly the invention in another embodiment provides a system and method for secure authentication of operations over a communication network where the user is required to provide confirmation or rejection on the insecure terminal only if the secure device does not automatically reject a fraudulent transaction.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

DEFINITIONS

The term "User Terminal" or "Insecure User Terminal" refers to a computer system on which the user runs a variety of software applications, stores information and connects to other information systems over public or private networks to transmit and receive information. This system might be a PC, Tablet, Mobile or any other device which user has physical access to operate, including more than one device attached together. Such a system has a high risk of being infected by malware, even with antivirus software enabled. The User Terminal also includes Insecure Input Devices such as a keyboards and mice and Insecure Output Devices such as monitors and displays.

The term "Server Computer" refers to a computer system which provides a service to users in the form of access to resources or information or performing an operation or task. The server computer is not accessible to the user physically and can be accessed only via commands based on request/response. It is assumed to be a secure system and not penetrable by malware.

The term "Secure Device" refers to a computer system on which a variety of software applications runs to securely connect, store, display, retrieve, and transmit information over public or private networks. This device might be a server, PC, Tablet, Mobile or any other device, or including more than one device attached together to form a secure environment. Such secure device is highly secured and not penetrable by malware. The secure device provides a secure environment to securely provide operations between the server and the user terminal to securely process the operations among each other.

The term "nonce" refers to a random number generated by the Server Computer that can serve as a unique identifier for an operation and cannot be guessed by malware.

The term "Random Tag" refers to a random message generated by the "Server Computer" that is expected to be reproduced by the user to confirm a request to perform an operation on the Server Computer. "Random Tag" may contain a combination of visual, audio and tactile cues.

The term "operation identifier" refers to information that can help the user or a system uniquely identify the operation request, wherein the information may be at least one of data associated with the operation request, a portion of the operation request or a combination of both.

The term "encryption/decryption" refers to transforming a message from one format to another format, thereby rendering the original message indecipherable by malware. Encryption/decryption may include public/private key, table lookup, hashing or any such prescribed secure method.

The present invention relates to a system and method for secure authentication of operations requested to be performed over an online communication network such as an internet or intranet, from a user computer whose security may have been compromised. The system utilizes a secure intelligent device or token with a secure mechanism to convey authentication related information to the user. The method and system enable automatic rejection of fraudulent operation requests without any manual intervention from the user. Also, the system and method enable the user to confirm or reject the operation request on the insecure user terminal.

This method comprises the steps of:
1. Sending a request from an Insecure User Terminal to Server Computer for performing an operation;
2. Server Computer creating a challenge with operation identifier, nonce, random tag for confirmation and optional random tag for rejection, encrypting the challenge and sending to Insecure Terminal;
3. Insecure terminal forwarding the encrypted challenge to the Secure User Device along with a copy of the original operation request sent from Insecure Terminal to Server Computer;

4. Secure User Device decrypting the challenge and comparing the operation request received from the insecure terminal and the operation identifier received from Server Computer;
5. If the operation request received from Insecure Terminal and operation identifier received from Server Computer do not match,
   a. Secure User Device sending an encrypted rejection response to Server Computer;
   b. Server Computer decrypting the response from Secure User Device;
   c. If response indicates rejection, Server Computer rejecting the request to access protected resource;
6. If the requests from Insecure Terminal and Server Computer match,
   a. Conveying the operation identifier to the user on the Secure User Device;
   b. Conveying random tag for confirmation and optional random tag for rejection on the Secure User Device;
   c. Prompting the user to provide the tag on the Insecure Terminal;
   d. Optionally, starting a timer on the secure device and conveying timeout information on the Secure User Device and/or on the Insecure Terminal (wherein the timeout is for a pre-configured period of time);
      i. If the user does not provide the tag on Insecure Terminal before expiry of timer on the secure device,
         a. Secure User Device sending an encrypted rejection response to Server Computer;
         b. Server Computer decrypting the response from Secure User Device;
         c. If response indicates rejection, Server Computer rejecting the request to access protected resource;
   e. If the user provides the tag on Insecure Terminal,
      i. Insecure Terminal sending the tag to Server Computer;
      ii. Server Computer receiving the tag;
      iii. On detecting match with random tag for confirmation, allowing the requested operation;
      iv. On detecting match with random tag for rejection, rejecting the operation request;
      v. On not detecting match with either random tag for confirmation or optional random tag for rejection, rejecting the operation request
      OR
      i. Insecure Terminal sending random tag to Secure Device;
      ii. Secure Device comparing random tag received from Server Computer and Insecure Terminal
      iii. On mismatch, sending an encrypted challenge rejection response to Server Computer;
         a. Server Computer rejecting the operation request in accordance with the received challenge rejection response.
      iv. On match with random tag for confirmation, sending an encrypted confirmation response to Server Computer
         b. Server Computer allowing the operation request in accordance with the received challenge confirmation response.
      vi. On match with random tag for rejection, sending an encrypted challenge rejection response to Server Computer;
         a. Server Computer rejecting the operation request in accordance with the received challenge rejection response.

In the case of remote man-in-the-middle attacks, information in a request is modified by malware in transit between user terminal and server computer. In such cases, information received at the secure user device from the user terminal and the server computer will not match, and therefore can be automatically rejected, without providing any information to or soliciting any information from the user on the secure device.

In the case of fraud caused by local man-in-the-middle attacks, the information in a request sent to the server computer is modified by malware resident on the insecure user terminal. Not all malware will be aware of the proxy application in the insecure terminal that forwards information to the secure user device. In such cases as well, information received at the secure user device from the user terminal and the server computer will not match, and therefore can be automatically rejected, without providing any information to or soliciting any information from the user on the secure device. The above scenarios account for a vast majority of fraud attempts and are therefore a significant improvement over prior systems which require user intervention for all operations.

More sophisticated malware may modify the information sent to both the server computer and the secure user device. Therefore, information received at the secure user device from the user terminal and the server computer might match, despite it being fraudulent. In such cases, the request information is conveyed to the user on the secure user device, where the user can ascertain if the information has been modified or not. If the user ascertains that the information has been modified and is therefore fraudulent, he can explicitly reject the request by providing an operation specific tag for rejection on the insecure terminal. Alternatively, he can choose to ignore the request wherein the secure device, if so configured, will send an encrypted rejection response to the server on timeout.

Only if the user ascertains that the information is valid, he needs to intervene and confirm the operation by providing an operation specific random tag for confirmation on the insecure terminal, before the expiry of timeout. The timeout period can be configured as per the convenience of the user. Of course, the user can also provide confirmation on the secure user device using a confirm button, provided for that specific purpose. However, a single button input mechanism is prone to inadvertent error. Enabling the user to provide confirmation on the insecure terminal using convenient mechanisms such as keyboard, mouse, microphone etc. reduces device complexity and increases ease of use for the user, without compromising on security. This aspect of the user being able to provide secure confirmation on the Insecure Terminal is a significant improvement over prior art methods that require the user to provide confirmation only in a secure environment.

Figure 1A:
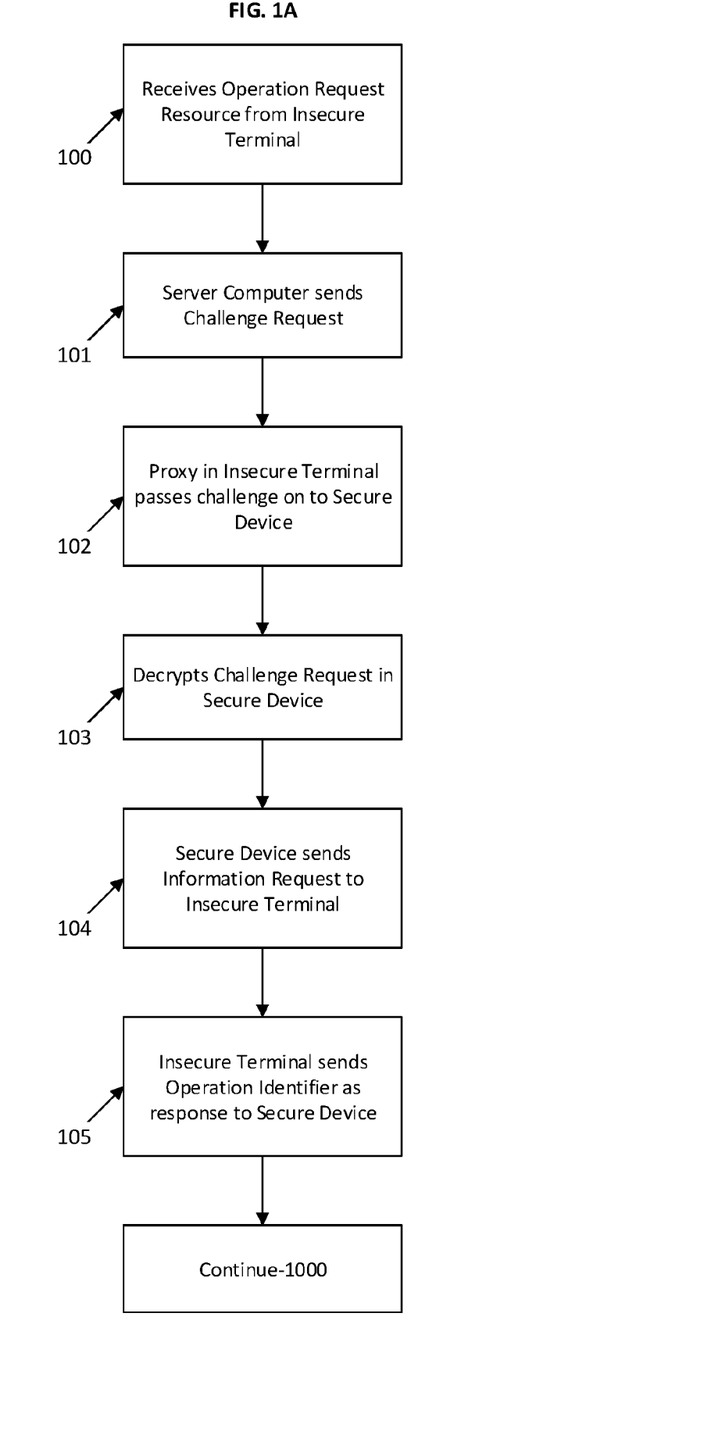
FIGS. 1A-1C represent a flow chart of a method of authenticating an operation, in accordance with one or more embodiments.
Figure 1B:
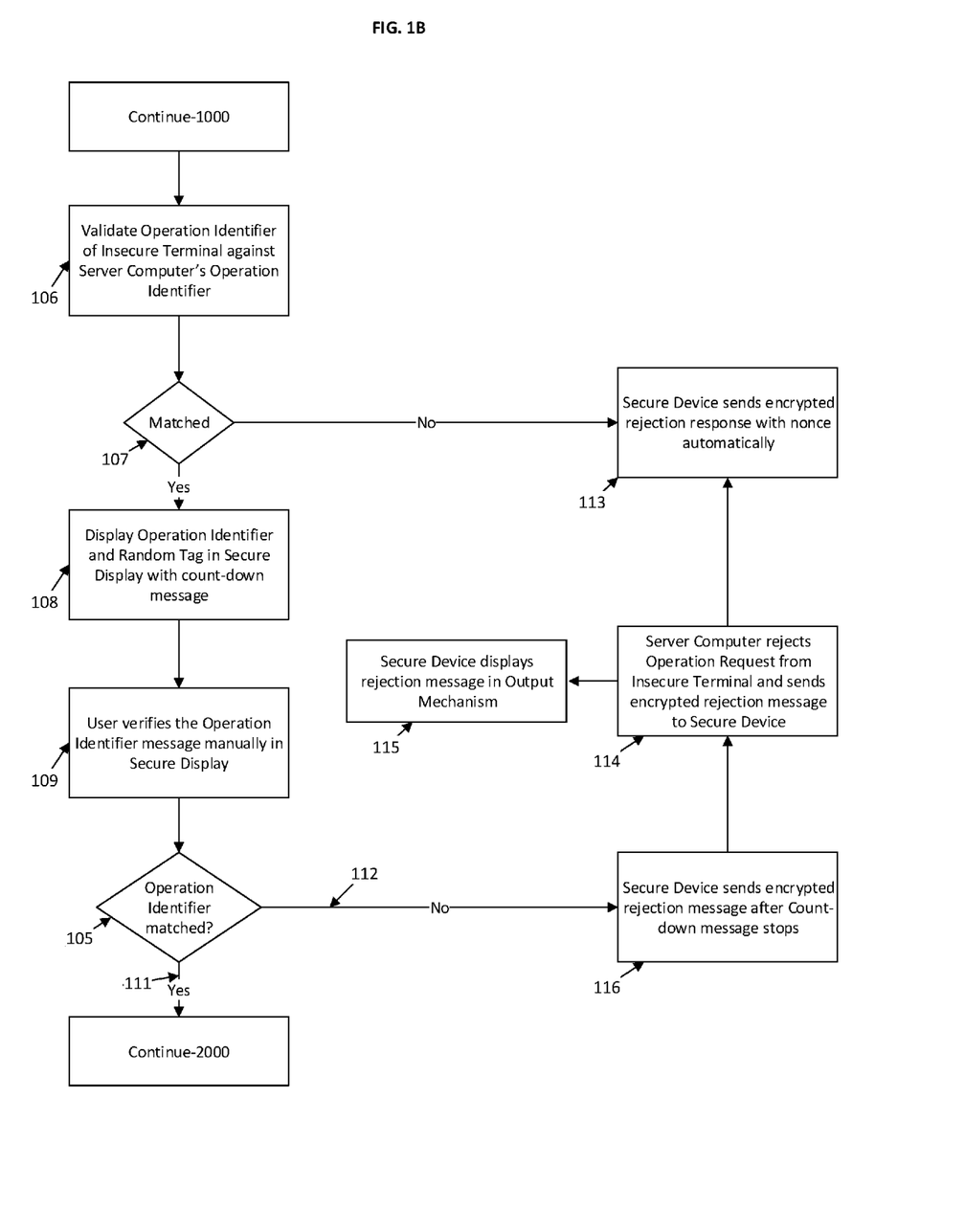
Figure 1C:
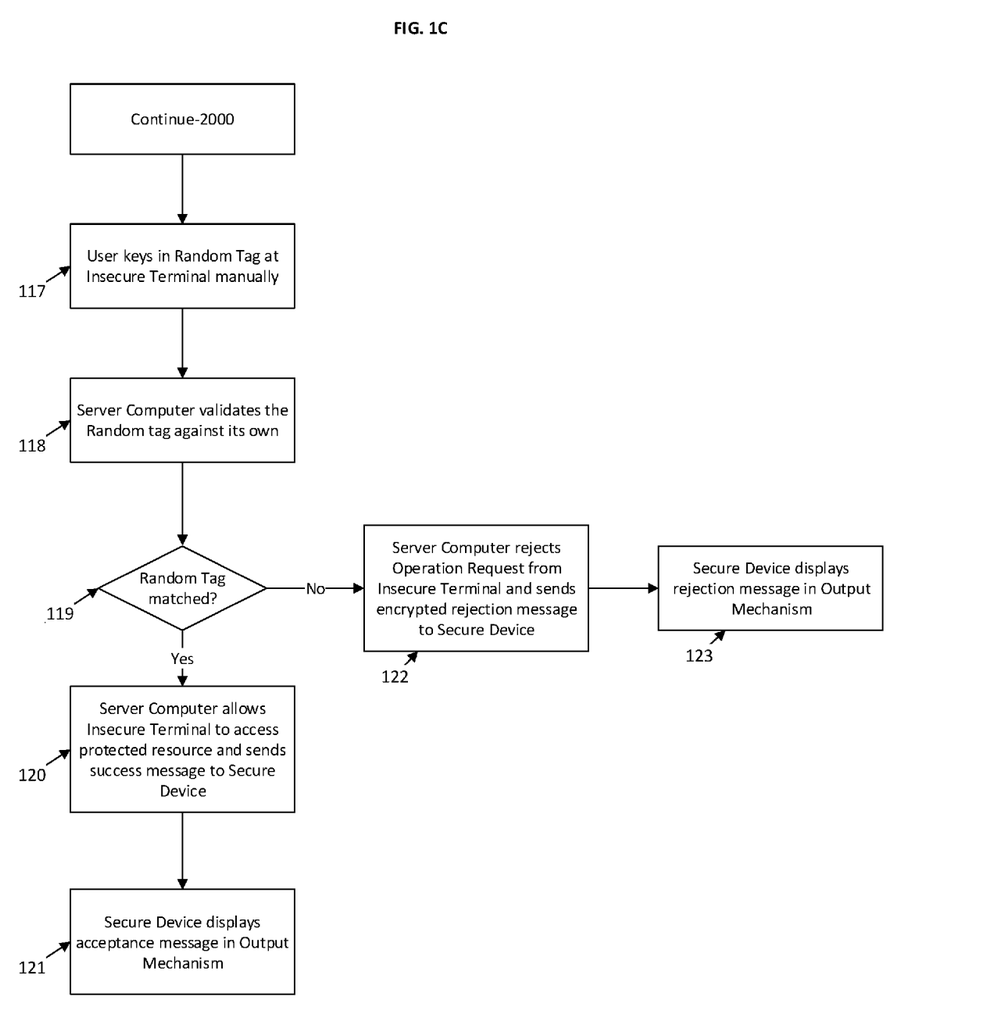
Figure 2:
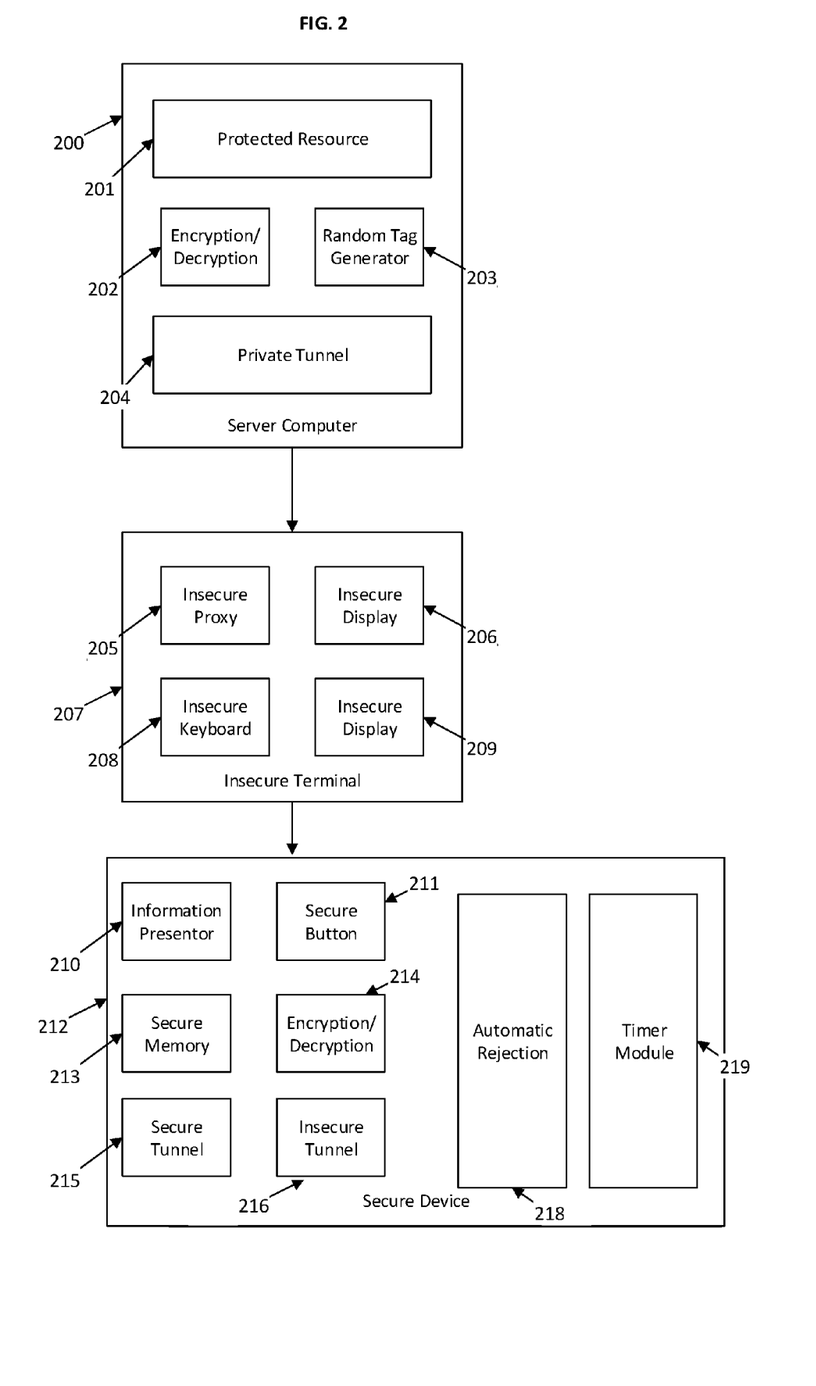
FIG. 2 is a block diagram of a system by which one or more embodiments are implemented.

Referring now to the drawings, and more particularly to FIGS. 1 through 2, where similar reference characters denote corresponding features consistently throughout the figures, there are shown preferred embodiments.

Referring to FIG. 2, the system has 3 main components—Server Computer 200, Insecure Terminal 207 and Secure Device 212.

Server Computer 200 comprises of Protected Resource 201 to which secure access is granted after authorization, Encryption/Decryption Unit 202 for encrypting and decrypting information, Random Tag Generator 203 to generate unique one time random message, Private tunnel 204 to send/receive any communication to Secure Device in separate tunnel. Protected Resource 201 represents information or operations controlled by Server Computer 200.

Insecure Terminal 207 comprises of an Insecure Proxy 205 that performs 3 primary tasks: (a) Forwarding information received from Server Computer 200 to the Secure Device 212 and vice versa; (b) Responding to requests from Secure Device 212; and (c) Presenting information provided by the Server Computer 200 and/or Secure Device 212 to the user on the Insecure Terminal 207; and sending information provided by the user on the Insecure Terminal 207 to the Server Computer 200 and/or Secure Device 212.

When the Insecure Terminal 207 gets encrypted challenge request from Server Computer 200, the Insecure Proxy 205 forwards it to the Secure Device 212. When the Insecure Terminal 207 gets encrypted rejection response or encrypted confirmation response from Secure Device 212, the Insecure Proxy 205 forwards it to the Server Computer 200. Insecure Proxy 205 also forwards Random Tag information provided by the user on Insecure Terminal 207 using Insecure Input Mechanism 208, to the Secure Server 200 and/or Secure Device 212. During data transition between Server Computer 200 and Secure Device 212, both encrypted and unencrypted information is available in Insecure Memory 209.

Secure Device 212 comprises of Secure Output Mechanism 210, Encryption/Decryption Unit 202, Secure Memory 213, Automatic Rejection Unit 218 and Processing Unit.

Information sent by Server Computer 200 is presented securely to the user on the Secure Device 212 using Secure Output Mechanism 210; this information being available in Secure Memory 213 which cannot be modified by any program from Insecure Terminal 207.

Automatic Rejection Unit 218 constructs and sends an encrypted rejection response in the following four scenarios: (a) operation identifier received from Server Computer 200 and operation request received from Insecure Terminal 207 don't match (b) random tag for confirmation not received from Insecure Terminal 207 before expiry of timeout (c) random tag received from Insecure User Terminal 207 and Server Computer 200 don't match (d) random tag for rejection received from Insecure User Terminal 207 and Server Computer 200 match FIGS. 1A-1C represent a flow chart illustrating the steps that are carried out as an embodiment of a method using the system shown in FIG. 2.

In step 100, the Server Computer 200 gets an Operation Request from Insecure Terminal 207 to access a Protected Resource 201. For example, this could be a transaction request such as fund transfer request sent over HTTPS connection to a banking server. It could be a file access request sent over an FTP connection to a file server in an intranet or the internet. It could be a request sent from email client software running on the Insecure Terminal to fetch unread emails from a mail server on a periodic automatic basis. It could be a request sent from application software such as a feed aggregator running on the Insecure Terminal to execute a web service on a remote server over the internet to compile and fetch relevant feeds using a HTTP connection. It could be an authorization request such as used for single sign-on sent to an authorization server.

To validate the request received in Step 100, the Server Computer 200, in step 101, constructs a Challenge Request consisting of nonce, Random Tag for Confirmation, Optional Random Tag for Rejection and an Operation Identifier. For example, the identifier for a file access request could be partial or complete file name; the identifier for a fund transfer request could be a combination of partial or complete information related to source account, destination account and amount; the identifier for a login request could be partial or complete information related to login name, destination URL etc. The Server Computer 200 then encrypts the Challenge Request and sends it to the Insecure Terminal 207. The Server Computer 200 also initiates a timer to enable graceful exit for potential failure scenarios such as not receiving the Challenge Response due to network or connectivity problems, message getting blocked by malware in Insecure Terminal etc.

In Step 102, Insecure Proxy 205 receives the Challenge Request, establishes a channel between Secure Device 212 and Insecure Terminal 207 and forwards the request to the Secure Device along with a copy of the original Operation Request.

In Step 103, Secure Device decrypts the Challenge Request and stores the information in its Secure Memory.

As a first step of automatic detection of a fraudulent operation, the Secure Device, in Step 104, compares the Operation Request received from the Insecure Terminal and the Operation Identifier received from the Server Computer. If a mismatch is found in Step 105, Secure Device in Step 110, constructs a Challenge Response consisting of nonce, Operation Identifier and Rejection Message, encrypts the Challenge Rejection Response and sends it to Server Computer. The Server Computer 200 decrypts the Challenge Rejection Response and having verified the nonce and Operation identifier therein, rejects the corresponding Operation Request in Step 122.

The Server Computer may also further send an encrypted Operation Rejection message to the Secure Device via the Insecure Proxy. The Secure Device can decrypt the Operation Rejection message and notify the user using the Secure Output Mechanism. The Server Computer or Secure Device may also send an Operation Rejection message to the Insecure Terminal. The Insecure Proxy then notifies the user about the rejection of the operation using output mechanisms connected to the Insecure Terminal.

In Step 105, if the there is a match between the Operation Request received from Insecure Terminal 207 and Operation Identifier received from Server Computer, the Secure Device cannot be certain that the Operation Request is valid. Therefore, in Step 106, the Secure Device presents the Operation Identifier and random tag for confirmation to the user using Secure Output Mechanism and requests the user to verify the Operation Request using the Operation Identifier and if valid, approve the Operation Request by providing the confirmation tag on the Insecure Terminal. The Secure Device may additionally in Step 106, present the random tag for rejection to the user using Secure Output Mechanism and request the user to reject the Operation Request, if invalid, by providing the rejection tag on the Insecure Terminal.

If the optional random tag for rejection is not presented to the user, and if the user finds the Operation Identifier to be invalid in Step 107, the user can ignore the challenge in Step 109 and let the Secure Device time out in Step 111. The Secure Device may also inform the user about the timeout procedure and request the user to provide the relevant tag before expiry of timeout in the Secure Device.

If the user notices a discrepancy in the information presented on the Secure Device in Step 107, he will provide the random tag for rejection on the Insecure Terminal in Step 110. On receiving the rejection tag in Step 112, the Insecure Proxy will send it in unencrypted form either to the Server Computer in Step 113 or to the Secure Device in Step 117.

On receiving the unencrypted tag, the Server Computer in Step 114 verifies the tag and on finding a match with the random tag for rejection in Step 115, rejects the Operation Request in Step 122.

If the Insecure Proxy sent the tag to the Secure Device in Step 117, the Secure Device in Step 118 compares the unencrypted tag received from Insecure Terminal in Step 117 and encrypted tags received from Server Computer earlier in Step 101. On finding a match with the random tag for rejection in Step 119, the Secure Device constructs a Challenge Rejection Response consisting of nonce, Operation Identifier and Rejection Message, encrypts the Challenge Response and sends it to the Server Computer in Step 121. On receiving the Challenge Rejection Response, the Server Computer decrypts the Challenge Response and having verified the nonce and Operation identifier therein, rejects the corresponding Operation Request in Step 122. The Server Computer may also notify the user about the rejection along with additional relevant information by sending an encrypted Rejection message to the Secure Device or to the Insecure Terminal.

If the user, in Step 107, ascertains that the Operation Information presented on Secure Device is valid, he proceeds to provide the random tag for confirmation on the Insecure Terminal in Step 108 to confirm the Challenge Request.

On receiving the confirmation tag in Step 180, the Insecure Proxy will send it in unencrypted form either to the Server Computer in Step 113 or to the Secure Device in Step 117.

On receiving the unencrypted tag in Step 113, the Server Computer in Step 114 verifies the tag and on finding a match with the random tag for confirmation in Step 115, allows the Operation Request in Step 116.

If the Insecure Proxy sent the tag to the Secure Device in Step 117, the Secure Device in Step 118 compares the unencrypted tag received from Insecure Terminal in Step 117 and encrypted tags received from Server Computer earlier in Step 102. On finding a match with the random tag for confirmation in Step 119, the Secure Device constructs a Challenge Rejection Response consisting of nonce, Operation Identifier and Confirmation Message, encrypts the Challenge Response and sends it to the Server Computer in Step 120. On receiving the Challenge Response, the Server Computer decrypts it and having verified the nonce, Operation identifier and Confirmation Message therein, allows the corresponding Operation Request in Step 116. If the user inadvertently misses out on providing the confirmation tag on the Insecure Terminal in Step 107, on not receiving the tag the timer on the Secure Device will expire in Step 111. In response to timeout in Step 111 the Secure Device, in Step 121, constructs a Challenge Response consisting of nonce, Operation Identifier and Rejection Message, encrypts the Challenge Response and sends it to Server Computer. Additional information about the cause of rejection may also be sent to the Server Computer to serve further analysis. The Server Computer decrypts the Challenge Response and having verified the nonce, Operation Identifier and Rejection Message therein, rejects the corresponding Operation Request in Step 122. The Server Computer may also further notify the user about the rejection along with additional relevant information by sending an encrypted Rejection Message to the Secure Device or to the Insecure Terminal to be presented to the user using corresponding Output Mechanisms.

It is illustrative to understand the method of the invention in detail by walking through various scenarios where malware can attempt to hijack the system and perform a fraudulent operation.

First a scenario of a remote man in middle attack is considered. For example, when a user on an Insecure Terminal 207 logs into Server Computer 200 by providing credentials, malware in the middle may cause all further requests from Insecure Terminal 207 to be diverted to a fraudulent webserver. This fraudulent webserver can provide a fake SSL certificate to Insecure Terminal 207. On the other end, the fake webserver connects to Server Computer 200 in real-time. The user is led to believe that he is connected to real Server Computer 200 to perform online fund transfer, but all HTTPS requests are going through fraudulent webserver in fake SSL. In Step 100, the user sends a transaction request by providing destination account information and amount intended for Server Computer 200. However, complete transaction information reaches the fraudulent webserver over a fake SSL; the fraudulent webserver may now change the destination account information and amount before forwarding transaction requests to Server Computer 200. In the present invention, in Step 101, the Server Computer 200 sends an encrypted Challenge Request with key transaction details to Secure Device 212 for verifying the transaction request; this encrypted request cannot be modified even if the challenge request is routed back through the fraudulent web server. Secure Device 212, in Step 104, compares the original request sent from Insecure Terminal 207 and the key transaction information received from Server 200. In this case, the two will not match; Secure Device 212, in Step 121, automatically sends an encrypted Operation Rejection message to Server Computer 200 to reject the transaction.

Considering a local man in middle attack possibility for the same scenario where a user on an Insecure Terminal 207 is logged into Server Computer 200 to transfer funds from one bank account to another. Once the user enters destination account information and amount in Insecure Terminal 207, malware in Insecure Terminal 207 may modify the destination account number and amount before sending it to Server Computer 200 without the knowledge of the user. In the present invention, the Server Computer 200, in Step 101, sends an encrypted Challenge Request containing received fraudulent account number and amount, to the Secure Device 212 for verifying the transaction request; this encrypted request cannot be modified by malware on the Insecure Terminal 207. If the malware is not aware of the Secure Device and has therefore not infected and modified the Insecure Proxy on the Insecure Terminal, the Insecure Proxy will forward the encrypted challenge along with the original request containing account number and amount information provided by the user, to the Secure Device 212, in Step 102. In Step 104, the Secure Device 212 compares the original request sent from Insecure Terminal 207 and the account and amount information received from Server 200. In this case, the two will not match; Secure Device 212, in Step 121, automatically sends an encrypted Operation Rejection message to Server Computer 200 to reject the transaction.

It is possible that malware in the above scenario is sophisticated enough to have infested and modified the local Insecure Proxy. In such a scenario, malware can modify the response such that the information sent to the Server 200 earlier in Step 100, and the one sent to the Secure Device in Step 102 are the same i.e. both the Server Computer and the Secure Device receive modified fraudulent account number and transaction amount. When the Secure Device 212 compares information received from Server Computer and Insecure Terminal in 104, these requests will match. The Secure Device 212 then presents the transaction information to the user in Step 106 using a Secure Output Mechanism, such as text displayed on a secure display, an audio message played via a secure speaker device etc. The Secure Device 212 also provides a random tag for confirmation and an optional random tag for rejection to the user using Secure Output Mechanism. Based on the information presented, the user can ascertain that the transaction is fraudulent and therefore either ignore the transaction leading to timeout on the Secure Device in Step 111 or provide the random tag for rejection on the Insecure Terminal in Step 110. In both cases, the Secure Device will send an automatic encrypted Operation Rejection message to the Server Computer to reject the transaction. Alternatively, the user-provided rejection tag can be sent in unencrypted form to the Server Computer in Step 113. On verifying the rejection tag, the Server Computer can reject the transaction.

In Step 110, when the user provides the random tag for rejection on the Insecure Terminal, malware resident on the Insecure Terminal can modify the same before it is sent to either the Server Computer or to the Secure Device. However, since the malware does not know the random tag for confirmation, the modification cannot cause any damage. The fraudulent transaction will be rejected if any tag other than the random tag for confirmation is provided by the user.

The embodiments disclosed herein can be implemented through at least one software program running on at least one hardware device and performing network management functions to control the network elements. The network elements shown in FIG. 2 include blocks which can be at least one of a hardware device, or a combination of hardware device and software module.

The embodiment disclosed herein describes a method and system to enable automatic rejection of fraudulent operation requests without any manual intervention from the user, using an intelligent security device. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A method of automatic detection and rejection of a fraudulent operation request, the method comprising of:
   sending an operation request from an insecure terminal to a server computer;
   sending an encrypted challenge by said server computer to a secure device connected to said insecure terminal, wherein said encrypted challenge comprises a nonce and an operation identifier;
   retrieving said operation identifier by said secure device by decrypting said encrypted challenge;
   receiving a copy of said operation request by said secure device from said insecure terminal;
   comparing said operation request received from said insecure terminal and said encrypted operation identifier received from said server computer by said secure device;
   constructing an encrypted challenge response comprising said nonce, said operation identifier and a rejection message by said secure device, on said secure device determining a mismatch between said operation request received from said insecure terminal and said encrypted operation identifier received from said server computer;
   sending said encrypted challenge response to said server computer by said secure device;
   decrypting said received challenge response by said server computer; and
   rejecting said operation request by said server computer based on said rejection message retrieved from said challenge response.

2. The method of claim 1, wherein sending said encrypted challenge by said server computer to said secure device connected to said insecure terminal, further comprises of:
   sending said encrypted challenge comprising nonce and operation identifier by said server computer to said insecure terminal; and
   forwarding said encrypted challenge to a secure device connected to said insecure terminal by an insecure proxy in said insecure terminal.

3. The method of claim 1, wherein sending said encrypted challenge response by said secure device to said server computer, further comprises of:
   sending said encrypted challenge response by said secure device to said insecure terminal; and
   forwarding said encrypted challenge response to said server computer by an insecure proxy in said insecure terminal.

4. The method of claim 2, wherein forwarding said encrypted challenge by said insecure proxy to said secure device further and receiving a copy of said original operation request from said insecure terminal by said secure device are combined into the step of:
   forwarding said encrypted challenge along with a copy of said original operation request by said insecure proxy in said insecure terminal to said secure device.

5. The method of claim 1, wherein receiving a copy of said operation request by said secure device from said insecure terminal further comprises of:
   requesting a copy of said original operation request from said insecure terminal by said secure device; and
   sending a copy of said original operation request by said insecure proxy to said secure device.

6. The method of claim 1, wherein said operation identifier is a portion of said operation request which uniquely identifies said operation request.

7. A method of enabling secure authentication of an operation by soliciting confirmation or rejection from a user on an insecure terminal, said method comprising of
sending an operation request from said insecure terminal to a server computer;
sending an encrypted challenge by said server computer to a secure device connected to said insecure terminal, wherein said encrypted challenge comprises a nonce, an operation identifier, a confirmation tag and a rejection tag;
retrieving said operation identifier, said confirmation tag and said rejection tag by said secure device, said secure device decrypting said encrypted challenge;
presenting said operation identifier, said confirmation tag and said rejection tag to said user using secure output mechanism on said secure device;
requesting said user to verify said operation identifier and to provide said confirmation tag or said rejection tag on said insecure terminal;
collecting said tag provided by said user on said insecure terminal;
constructing and sending a challenge response to said server computer based on said user-provided tag by said user on said insecure terminal and
allowing or rejecting said operation request by said server computer in accordance with said received challenge response.

8. The method of claim 7, wherein sending said encrypted challenge by said server computer to said secure device connected to said insecure terminal, further comprises of:
sending said encrypted challenge comprising nonce, operation identifier, confirmation tag and rejection tag by said server computer to said insecure terminal; and
forwarding said encrypted challenge to a secure device connected to said insecure terminal by an insecure proxy in said insecure terminal.

9. The method of claim 7, further comprises
sending a challenge response by an insecure proxy on said insecure terminal comprising said user-provided tag for confirmation or rejection in unencrypted form to said server computer; and
allowing or rejecting said operation request by said server computer in accordance with validity of said received tag.

10. The method of claim 9, further comprises allowing said operation request by said server computer on receiving valid confirmation tag in said challenge response.

11. The method of claim 9, further comprises rejecting said operation request by said server computer on receiving valid rejection tag in said challenge response.

12. The method of claim 9, further comprises rejecting said operation request by said server computer on receiving invalid tag in said challenge response.

13. The method of claim 9, further comprises rejecting said operation request by said server computer on not receiving any tag in said challenge response.

14. The method of claim 9, further comprises rejecting said operation request by said server computer on not receiving a challenge response within a stipulated time period.

15. The method of claim 7 further comprises
sending said user provided tag by said insecure proxy on said insecure terminal to said secure device connected to said insecure terminal;
determining a match between said user-provided tag and said confirmation or rejection tag received from said server computer by said secure device;
constructing an encrypted challenge response by said secure device comprising said nonce, said operation identifier and a confirmation or rejection message based on validity of said user-provided confirmation or rejection tag received from said insecure terminal;
sending it to said server computer; and
allowing or rejecting by said server computer said operation request in accordance with said received challenge response.

16. The method of claim 15, further comprises
sending said encrypted challenge response by said secure device to said insecure terminal; and
forwarding said received encrypted challenge response by said insecure proxy on said insecure terminal to said server computer.

17. The method of claim 15, further comprises
constructing an encrypted challenge confirmation response by said secure device comprising said nonce, said operation identifier and a confirmation message on receiving a valid confirmation tag from said insecure terminal;
sending said encrypted challenge confirmation response by said secure device to server computer;
decrypting said encrypted challenge response by said server computer and extracting said nonce, operation identifier and confirmation message therein; and
allowing said operation request by said server computer in accordance with received operation identifier and confirmation message.

18. The method of claim 15, further comprises
constructing an encrypted challenge rejection response by said secure device comprising said nonce, said operation identifier and a rejection message on receiving a valid rejection tag;
sending said encrypted challenge rejection response by said secure device to said server computer;
decrypting said received encrypted challenge response by said server computer and extracting said nonce, said operation identifier and said rejection message therein; and
rejecting said operation request by said server computer in accordance with said received operation identifier and rejection message.

19. The method of claim 15, further comprises
constructing an encrypted challenge rejection response by said secure device comprising said nonce, said operation identifier and a rejection message on receiving an invalid tag;
sending said encrypted challenge rejection response by said secure device to said server computer;
decrypting said received encrypted challenge response by said server computer and extracting said nonce, said operation identifier and said rejection message therein; and
rejecting said operation request by said server computer in accordance with said received operation identifier and rejection message.

20. The method of claim 15, further comprises starting a timer on said secure device;
constructing an encrypted challenge rejection response by said secure device comprising said nonce, said operation identifier and a rejection message on said secure device not receiving any tag before expiry of timeout;
sending said encrypted challenge rejection response by said secure device to said server computer;

decrypting said received encrypted challenge response by said server computer and extracting said nonce, said operation identifier and said rejection message therein; and rejecting said operation request by said server computer in accordance with said received operation identifier and rejection message.

21. The method of claim 15, further comprises starting a timer on said secure device;
presenting timeout information to said user using secure output mechanism on secure device;
requesting said user to provide confirmation or rejection tag on insecure terminal before expiry of timeout;
constructing an encrypted challenge rejection response by said secure device comprising said nonce, said operation identifier and a rejection message on said secure device not receiving any tag before expiry of timeout;
sending said encrypted challenge rejection response by said secure device to said server computer;
decrypting said received encrypted challenge response by said server computer and extracting said nonce, said operation identifier and said rejection message therein; and
rejecting said operation request by said server computer in accordance with said received operation identifier and rejection message.

22. The method of claim 15, further comprises rejecting said operation request by said server computer on not receiving a challenge response within a stipulated time period.

23. The method of claim 15, further comprises
sending an operation request from said insecure terminal to a server computer;
sending an encrypted challenge by said server computer to a secure device connected to said insecure terminal, wherein said encrypted challenge comprises a nonce, an operation identifier and a confirmation tag;
retrieving said operation identifier and said confirmation tag by said secure device, said secure device decrypting said encrypted challenge;
presenting said operation identifier and said confirmation tag to said user using secure output mechanism on said secure device;
requesting said user to verify said operation identifier and to provide said confirmation tag on said insecure terminal;
collecting said tag provided by said user on said insecure terminal;
constructing and sending a challenge response to said server computer based on said user-provided tag by said user on said insecure terminal and
allowing or rejecting said operation request by said server computer in accordance with said received challenge response.

24. The method of claim 23, further comprises
sending a challenge response by an insecure proxy on said insecure terminal comprising said user-provided tag for confirmation in unencrypted form to said server computer; and
allowing or rejecting said operation request by said server computer in accordance with validity of said received tag.

25. The method of claim 24, further comprises allowing said operation request by said server computer on receiving valid confirmation tag in said challenge response.

26. The method of claim 24, further comprises rejecting said operation request by said server computer on receiving invalid tag in said challenge response.

27. The method of claim 24, further comprises rejecting said operation request by said server computer on not receiving any tag in said challenge response.

28. The method of claim 24, further comprises rejecting said operation request by said server computer on not receiving a challenge response within a stipulated time period.

29. The method of claim 23 further comprises
sending said user provided tag by said insecure proxy on said insecure terminal to said secure device connected to said insecure terminal;
determining a match between said user-provided tag and said confirmation tag received from said server computer by said secure device;
constructing an encrypted challenge response by said secure device comprising said nonce, said operation identifier and a confirmation or rejection message based on validity of said user-provided confirmation tag received from said insecure terminal;
sending it to said server computer; and
allowing or rejecting by said server computer said operation request in accordance with said received challenge response.

30. The method of claim 29, further comprises
sending said encrypted challenge response by said secure device to said insecure terminal; and
forwarding said received encrypted challenge response by said insecure proxy on said insecure terminal to said server computer.

31. The method of claim 29, further comprises
constructing an encrypted challenge confirmation response by said secure device comprising said nonce, said operation identifier and a confirmation message on receiving a valid confirmation tag from said insecure terminal;
sending said encrypted challenge confirmation response by said secure device to server computer;
decrypting said encrypted challenge response by said server computer and extracting said nonce, operation identifier and confirmation message therein; and
allowing said operation request by said server computer in accordance with received operation identifier and confirmation message.

32. The method of claim 29, further comprises
constructing an encrypted challenge rejection response by said secure device comprising said nonce, said operation identifier and a rejection message on receiving an invalid tag;
sending said encrypted challenge rejection response by said secure device to said server computer;
decrypting said received encrypted challenge response by said server computer and extracting said nonce, said operation identifier and said rejection message therein; and
rejecting said operation request by said server computer in accordance with said received operation identifier and rejection message.

33. The method of claim 29, further comprises starting a timer on said secure device;
constructing an encrypted challenge rejection response by said secure device comprising said nonce, said operation identifier and a rejection message on said secure device not receiving any tag before expiry of timeout;
sending said encrypted challenge rejection response by said secure device to said server computer;

decrypting said received encrypted challenge response by said server computer and extracting said nonce, said operation identifier and said rejection message therein; and rejecting said operation request by said server computer in accordance with said received operation identifier and rejection message.

34. The method of claim 29, further comprises starting a timer on said secure device;

presenting timeout information to said user using secure output mechanism on secure device;

requesting said user to provide confirmation or rejection tag on insecure terminal before expiry of timeout;

constructing an encrypted challenge rejection response by said secure device comprising said nonce, said operation identifier and a rejection message on said secure device not receiving any tag before expiry of timeout;

sending said encrypted challenge rejection response by said secure device to said server computer;

decrypting said received encrypted challenge response by said server computer and extracting said nonce, said operation identifier and said rejection message therein; and rejecting said operation request by said server computer in accordance with said received operation identifier and rejection message.

35. The method of claim 29, further comprises rejecting said operation request by said server computer on not receiving a challenge response within a stipulated time period.

36. A method of secure authentication comprising of:

sending an operation request from an insecure terminal to a server computer;

sending an encrypted challenge by said server computer to a secure device connected to said insecure terminal, wherein said encrypted challenge comprises a nonce, an operation identifier, a confirmation tag and a rejection tag;

retrieving said operation identifier, confirmation tag and rejection tag by said secure device, on said secure device decrypting said encrypted challenge;

receiving a copy of said operation request by said secure device from said insecure terminal;

comparing said operation request received from said insecure terminal and said encrypted operation identifier received from said server computer by said secure device;

constructing an encrypted challenge response comprising said nonce, said operation identifier and a rejection message and sending said challenge response to said server computer by said secure device, on said secure device determining a mismatch between said operation request received from said insecure terminal and said encrypted operation identifier received from said server computer;

on determining a match, said following steps being performed presenting to said user said operation identifier, said confirmation tag and said rejection tag using secure output mechanism on said secure device;

requesting said user to verify said operation identifier and provide said confirmation tag or said rejection tag on said insecure terminal;

collecting said tag provided by said user on said insecure terminal;

constructing and sending a challenge response to said server computer by said insecure terminal based on said user-provided tag on said insecure terminal; and allowing or rejecting said operation request by said server computer based on said received challenge response.

37. The method of claim 36, wherein sending said encrypted challenge by said server computer to said secure device connected to said insecure terminal, further comprises of:

sending said encrypted challenge to said insecure terminal; and forwarding said encrypted challenge to a secure device connected to said insecure terminal by an insecure proxy in said insecure terminal.

38. The method of claim 37, wherein forwarding said encrypted challenge by said insecure proxy to said secure device further and receiving a copy of said original operation request from said insecure terminal by said secure device are combined into the step of:

forwarding said encrypted challenge along with a copy of said original operation request by said insecure proxy in said insecure terminal to said secure device.

39. The method of claim 36, wherein receiving a copy of said operation request by said secure device from said insecure terminal further comprises of:

requesting a copy of said original operation request from said insecure terminal by said secure device; and sending a copy of said original operation request by said insecure proxy to said secure device.

40. The method of claim 36, further comprises sending a challenge response by an insecure proxy on said insecure terminal comprising said user-provided tag for confirmation or rejection in unencrypted form to said server computer; and allowing or rejecting said operation request by said server computer in accordance with validity of said received tag.

41. The method of claim 40, further comprises allowing said operation request by said server computer on receiving valid confirmation tag in said challenge response.

42. The method of claim 40, further comprises rejecting said operation request by said server computer on receiving valid rejection tag in said challenge response.

43. The method of claim 40, further comprises rejecting said operation request by said server computer on receiving invalid tag in said challenge response.

44. The method of claim 40, further comprises rejecting said operation request by said server computer on not receiving any tag in said challenge response.

45. The method of claim 40, further comprises rejecting said operation request by said server computer on not receiving a challenge response within a stipulated time period.

46. The method of claim 39 further comprises sending said user provided tag by said insecure proxy on said insecure terminal to said secure device connected to said insecure terminal;

determining a match between said user-provided tag and said confirmation or rejection tag received from said server computer by said secure device;

constructing an encrypted challenge response by said secure device comprising said nonce, said operation identifier and a confirmation or rejection message based on validity of said user-provided confirmation or rejection tag received from said insecure terminal;

sending it to said server computer; and allowing or rejecting by said server computer said operation request in accordance with said received challenge response.

47. The method of claim 46, further comprises
sending said encrypted challenge response by said secure device to said insecure terminal; and
forwarding said received encrypted challenge response by said insecure proxy on said insecure terminal to said server computer.

48. The method of claim 46, further comprises
constructing an encrypted challenge confirmation response by said secure device comprising said nonce, said operation identifier and a confirmation message on receiving a valid confirmation tag from said insecure terminal;
sending said encrypted challenge confirmation response by said secure device to server computer;
decrypting said encrypted challenge response by said server computer and extracting said nonce, operation identifier and confirmation message therein; and
allowing said operation request by said server computer in accordance with received operation identifier and confirmation message.

49. The method of claim 46, further comprises
constructing an encrypted challenge rejection response by said secure device comprising said nonce, said operation identifier and a rejection message on receiving a valid rejection tag;
sending said encrypted challenge rejection response by said secure device to said server computer;
decrypting said received encrypted challenge response by said server computer and extracting said nonce, said operation identifier and said rejection message therein; and
rejecting said operation request by said server computer in accordance with said received operation identifier and rejection message.

50. The method of claim 46, further comprises
constructing an encrypted challenge rejection response by said secure device comprising said nonce, said operation identifier and a rejection message on receiving an invalid tag;
sending said encrypted challenge rejection response by said secure device to said server computer;
decrypting said received encrypted challenge response by said server computer and extracting said nonce, said operation identifier and said rejection message therein; and
rejecting said operation request by said server computer in accordance with said received operation identifier and rejection message.

51. The method of claim 46, further comprises starting a timer on said secure device;
constructing an encrypted challenge rejection response by said secure device comprising said nonce, said operation identifier and a rejection message on said secure device not receiving any tag before expiry of timeout;
sending said encrypted challenge rejection response by said secure device to said server computer;
decrypting said received encrypted challenge response by said server computer and extracting said nonce, said operation identifier and said rejection message therein; and
rejecting said operation request by said server computer in accordance with said received operation identifier and rejection message.

52. The method of claim 46, further comprises starting a timer on said secure device;
presenting timeout information to said user using secure output mechanism on secure device;
requesting said user to provide confirmation or rejection tag on insecure terminal before expiry of timeout;
constructing an encrypted challenge rejection response by said secure device comprising said nonce, said operation identifier and a rejection message on said secure device not receiving any tag before expiry of timeout;
sending said encrypted challenge rejection response by said secure device to said server computer;
decrypting said received encrypted challenge response by said server computer and extracting said nonce, said operation identifier and said rejection message therein; and
rejecting said operation request by said server computer in accordance with said received operation identifier and rejection message.

53. The method of claim 46, further comprises rejecting said operation request by said server computer on not receiving a challenge response within a stipulated time period.

54. A method of claim 36, further comprises
sending an operation request from an insecure terminal to a server computer;
sending an encrypted challenge by said server computer to a secure device connected to said insecure terminal, wherein said encrypted challenge comprises a nonce, an operation identifier and a confirmation tag;
retrieving said operation identifier and confirmation tag by said secure device, on said secure device decrypting said encrypted challenge;
receiving a copy of said operation request by said secure device from said insecure terminal;
comparing said operation request received from said insecure terminal and said encrypted operation identifier received from said server computer by said secure device;
constructing an encrypted challenge response comprising said nonce, said operation identifier and a rejection message and sending said challenge response to said server computer by said secure device, on said secure device determining a mismatch between said operation request received from said insecure terminal and said encrypted operation identifier received from said server computer;
on determining a match, said following steps being performed
presenting to said user said operation identifier and said confirmation tag using secure output mechanism on said secure device;
requesting said user to verify said operation identifier and provide said confirmation tag on said insecure terminal;
collecting said tag provided by said user on said insecure terminal;
constructing and sending a challenge response to said server computer by said insecure terminal based on said user-provided tag on said insecure terminal; and
allowing or rejecting said operation request by said server computer based on said received challenge response.

55. The method of claim 54, further comprises
sending a challenge response by an insecure proxy on said insecure terminal comprising said user-provided tag for confirmation in unencrypted form to said server computer; and
allowing or rejecting said operation request by said server computer in accordance with validity of said received tag.

56. The method of claim 55, further comprises allowing said operation request by said server computer on receiving valid confirmation tag in said challenge response.

57. The method of claim 55, further comprises rejecting said operation request by said server computer on receiving invalid tag in said challenge response.

58. The method of claim 55, further comprises rejecting said operation request by said server computer on not receiving any tag in said challenge response.

59. The method of claim 55, further comprises rejecting said operation request by said server computer on not receiving a challenge response within a stipulated time period.

60. The method of claim 54 further comprises
sending said user provided tag by said insecure proxy on said insecure terminal to said secure device connected to said insecure terminal;
determining a match between said user-provided tag and said confirmation tag received from said server computer by said secure device;
constructing an encrypted challenge response by said secure device comprising said nonce, said operation identifier and a confirmation or rejection message based on validity of said user-provided confirmation tag received from said insecure terminal;
sending it to said server computer; and
allowing or rejecting by said server computer said operation request in accordance with said received challenge response.

61. The method of claim 60, further comprises
sending said encrypted challenge response by said secure device to said insecure terminal; and
forwarding said received encrypted challenge response by said insecure proxy on said insecure terminal to said server computer.

62. The method of claim 60, further comprises
constructing an encrypted challenge confirmation response by said secure device comprising said nonce, said operation identifier and a confirmation message on receiving a valid confirmation tag from said insecure terminal;
sending said encrypted challenge confirmation response by said secure device to server computer;
decrypting said encrypted challenge response by said server computer and extracting said nonce, operation identifier and confirmation message therein; and
allowing said operation request by said server computer in accordance with received operation identifier and confirmation message.

63. The method of claim 60, further comprises
constructing an encrypted challenge rejection response by said secure device comprising said nonce, said operation identifier and a rejection message on receiving an invalid tag;
sending said encrypted challenge rejection response by said secure device to said server computer;
decrypting said received encrypted challenge response by said server computer and extracting said nonce, operation identifier and said rejection message therein; and
rejecting said operation request by said server computer in accordance with said received operation identifier and rejection message.

64. The method of claim 60, further comprises starting a timer on said secure device;
constructing an encrypted challenge rejection response by said secure device comprising said nonce, said operation identifier and a rejection message on said secure device not receiving any tag before expiry of timeout;
sending said encrypted challenge rejection response by said secure device to said server computer;
decrypting said received encrypted challenge response by said server computer and extracting said nonce, said operation identifier and said rejection message therein; and
rejecting said operation request by said server computer in accordance with said received operation identifier and rejection message.

65. The method of claim 60, further comprises starting a timer on said secure device;
presenting timeout information to said user using secure output mechanism on secure device;
requesting said user to provide confirmation or rejection tag on insecure terminal before expiry of timeout;
constructing an encrypted challenge rejection response by said secure device comprising said nonce, said operation identifier and a rejection message on said secure device not receiving any tag before expiry of timeout;
sending said encrypted challenge rejection response by said secure device to said server computer;
decrypting said received encrypted challenge response by said server computer and extracting said nonce, said operation identifier and said rejection message therein; and
rejecting said operation request by said server computer in accordance with said received operation identifier and rejection message.

66. The method of claim 60, further comprises rejecting said operation request by said server computer on not receiving a challenge response within a stipulated time period.

67. A system for secure authentication of an operation request, said system comprising at least one server computer, at least one secure device and at least one insecure terminal,
wherein said at least one server computer comprises:
a protected resource to which secure access is granted after authorization;
a first encryption/decryption processor for encrypting and decrypting information;
a random tag processor configured to generate a unique onetime random message; and
a private tunnel to send/receive any communication to said at least one secure device in a separate tunnel;
wherein said at least one insecure terminal comprises:
an insecure proxy configured to
forward information received from said at least one server computer to said at least one secure device;
forward information received from said at least one secure device to said at least one server computer;
respond to requests from said secure device;
present information provided by said server computer and said secure device to a user; and
send information provided by said user to said server computer and said secure device; and
wherein said at least one secure device comprises:
a secure output mechanism;
a second encryption/decryption unit;
a secure memory;
a timer; and
a processor configured to
send a request to said insecure terminal to send said operation request to said secure device, wherein said operation request is an operation request sent by said server computer to said insecure terminal;

check if said operation request received from said at least one insecure terminal and said at least one server computer match;
check if a user provided tag is valid; and
construct and send an encrypted challenge response based on said operation request received from said at least one insecure terminal and said at least one server computer being determined to match, and said user provided tag being determined to be valid.

* * * * *